United States Patent
Higashijima et al.

(10) Patent No.: US 6,340,880 B1
(45) Date of Patent: Jan. 22, 2002

(54) METHOD OF PROTECTING A CHARGEABLE ELECTRIC CELL

(75) Inventors: Yasuhisa Higashijima, Hadano; Yukihiro Terada; Hiroshi Nagaoka, both of Atsugi, all of (JP)

(73) Assignee: Mitsumi Electric Co., Ltd., Tokyo (JP)

(*) Notice: Subject to any disclaimer, the term of this patent is extended or adjusted under 35 U.S.C. 154(b) by 0 days.

(21) Appl. No.: 09/710,666

(22) Filed: Nov. 9, 2000

(30) Foreign Application Priority Data

Nov. 11, 1999 (JP) .......................................... 11-321319
Dec. 8, 1999 (JP) .......................................... 11-348535

(51) Int. Cl.[7] ................................................. H02J 7/01
(52) U.S. Cl. ...................... 320/162; 320/134; 320/136
(58) Field of Search ................................. 320/162, 136, 320/134

(56) References Cited

U.S. PATENT DOCUMENTS 5,635,821 A * 6/1997 Smith .......................... 320/103
5,909,103 A * 6/1999 Williams .................... 320/134

FOREIGN PATENT DOCUMENTS

JP          2872365          1/1999

* cited by examiner

Primary Examiner—Gregory J. Toatley, Jr.
(74) Attorney, Agent, or Firm—Frishauf, Holtz, Goodman, Langer & Chick, P.C.

(57) ABSTRACT

In a secondary battery protection circuit for protecting a secondary battery (300), on discharging, a discharge switch off arrangement (211, 212, 213, 214) turns a discharge control switch (FET1) off when a battery voltage (Vcc) is lower than a predetermined overdischarge detection threshold voltage. A discharge switch on arrangement (216, 217, 218, 219) immediately turns the discharge control switch on when a charger (500) for a load (400) is connected between external connection terminals (101, 102). On charging, a charge switch off arrangement (221, 222, 223, 224) turns a charge control switch (FET2) off when the battery voltage is higher than a predetermined overcharge detection threshold voltage. A charge switch on arrangement (226A, 227B, 228A, 229) immediately turns the charge control switch on when the load for the charger is connected between the external connection terminals.

21 Claims, 8 Drawing Sheets

METHOD OF PROTECTING A CHARGEABLE ELECTRIC CELL

BACKGROUND OF THE INVENTION

This invention relates to a secondary battery protection circuit for use in a battery unit comprising at least one chargeable electric cell (secondary battery) such as a lithium ion cell and, in particular, to a secondary battery protection circuit comprising an overdischarge prevention circuit and an overcharge prevention circuit.

Among various types of chargeable electric cells, a lithium ion cell is particularly weak against overdischarge or overcharge. In this connection, it is essential to provide a secondary battery protection circuit for detecting an overdischarge condition and an overcharge condition to protect a secondary battery from the overdischarge condition and the overcharge condition. For this purpose, the secondary battery protection circuit comprises an overdischarge prevention circuit and an overcharge prevention circuit. In addition, the secondary battery protection circuit may detect an overcurrent condition during discharge of the secondary battery to protect the secondary cell from the overcurrent condition. In this event, the secondary battery protection circuit may comprise an overcurrent prevention circuit as well as the overdischarge prevention circuit and the overcharge prevention circuit. However, description will be hereinuder directed to the secondary battery protection circuit comprising the overdischarge prevention circuit and the overcharge circuit.

Such a secondary battery protection circuit is disclosed, for example, in Japanese Granted Patent Publication of No. 2,872,365 or JP-B 2872365 (which will later be called "prior art reference") under the title of "CHARGEABLE POWER UNIT." According to JP-B 2872365, the secondary battery protection circuit comprises a secondary battery, a discharge control switch, and a charge control switch. The discharge control switch and the charge control switch comprise first and second MOSFETs containing first and second parasitic diodes, respectively. The first parasitic diode is connected to the first MOSFET so that a forward direction of the first parasitic diode coincides with a charging direction of the secondary battery. The second parasitic diode is connected to the second MOSFET so that a forward direction of the second parasitic diode coincides with a discharging direction of the secondary battery.

However, in the manner which will later be described in conjunction with FIGS. 1 and 2 in detail, it is feared that the following problems occur in the above-mentioned prior art reference. That is, energy is consumed in the charge control switch (the second MOSFET) for a time duration from a time instant when a load is connected between external connection terminals and to a time instant when the second MOSFET is turned on. This is because the discharging current flows through the second parasitic diode in the second MOSFET for this time duration. As a result, if this time duration is too long, heat generates in the second MOSFET and it is therefore feared that destruction of the second MOSFET is caused by the generated heat. Likewise, energy is consumed in the discharge control switch (the first MOSFET) for a time duration from a time instant when a charger is connected between the external connection terminals to a time instant when the first MOSFET is turned on. This is because the charging current flows through the first parasitic diode in the first MOSFET for this time duration. As a result, if this time duration is too long, heat generates in the first MOSFET and it is therefore feared that destruction of the first MOSFET is caused by the generated heat.

SUMMARY OF THE INVENTION

It is therefore an object of the present invention to provide a secondary battery protection circuit which is capable of prevent a charge control switch from destroying.

It is another object of the present invention to provide a secondary battery protection circuit which is capable of prevent a discharge control switch and a charge control switch from destroying.

Other objects of this invention will become clear as the description proceeds.

On describing the gist of an aspect of this invention, it is possible to be understood that a method is for protecting a secondary battery by controlling, by turning a charge control switch on and off, a charging current flowing through the secondary battery from a charger connected between external connection terminals. The secondary battery generates a battery voltage.

According to the aspect of this invention, the above-mentioned method comprises the steps of turning the charge control switch off when the battery voltage is higher than an overcharge detection threshold voltage, and of immediately turning the charge control switch on when a load for the charger is connected between the external connection terminals.

On describing the gist of another aspect of this invention, it is possible to be understood that a secondary battery protection circuit is for protecting a secondary battery by controlling, by turning a charge control switch on and off, a charging current flowing through the secondary battery from a charger connected between external connection terminals. The secondary battery is connected between a power source terminal and a ground terminal to generate a battery voltage.

According to the other aspect of this invention, the above-understood secondary battery protection circuit comprises a switch off arrangement for turning the charge control switch off when the battery voltage is higher than an overcharge detection threshold voltage. A switch on arrangement is for immediately turning the charge control switch on when a load for the charger is connected between the external connection terminals.

On describing the gist of still another aspect of this invention, it is possible to be understood that a method is for protecting a secondary battery by controlling, by turning a discharge control switch on and off, a discharging current flowing from the secondary battery through a load connected between external connection terminals and by controlling, by turning a charge control switch on and off, a charging current flowing through the secondary battery from a charger connected between the external connection terminals. The secondary battery generates a battery voltage.

According to the still another aspect of this invention, the above-understood method comprising the steps of, on discharging where the load is connected between the external connection terminals or on naturally discharging, turning the discharge control switch off when the battery voltage is lower than a predetermined overdischarge detection threshold voltage, of immediately turning the discharge control switch on when the charger for the load is connected between the external connection terminals, of, on charging where said charger is connected between the external connection terminals, turning the charge control switch off when the battery voltage is higher than a predetermined overcharge detection threshold voltage, and of immediately turning the charge control switch on when the load for the charger is connected between the external connection terminals.

On describing the gist of yet another aspect of this invention, it is possible to be understood that a secondary battery protection circuit is for protecting a secondary battery by controlling, by turning a discharge control switch on and off, a discharging current flowing from the secondary battery through a load connected between external connection terminals and by controlling, by turning a charge control switch on and off, a charging current flowing through the secondary battery from a charger connected between the external connection terminals. The secondary battery is connected between a power source terminal and a ground terminal to generate a battery voltage.

According to the yet another aspect of this invention, the above-understood secondary battery protection circuit comprises a discharge switch off arrangement, on discharging where the load is connected between the external connection terminals or on naturally discharging, for turning the discharge control switch off when the battery voltage is lower than a predetermined overdischarge detection threshold voltage. A discharge switch on arrangement is for immediately turning the discharge control switch on when the charger for the load is connected between the external connection terminals. On charging where the charger is connected between the external connection terminals, a charge switch off arrangement is for turning the charge control switch off when the battery voltage is higher than a predetermined overcharge detection threshold voltage. A charge switch on arrangement is for immediately turning the charge control switch on when the load for the charger is connected between the external connection terminals.

DESCRIPTION OF THE PREFERRED EMBODIMENT

Figure 1:
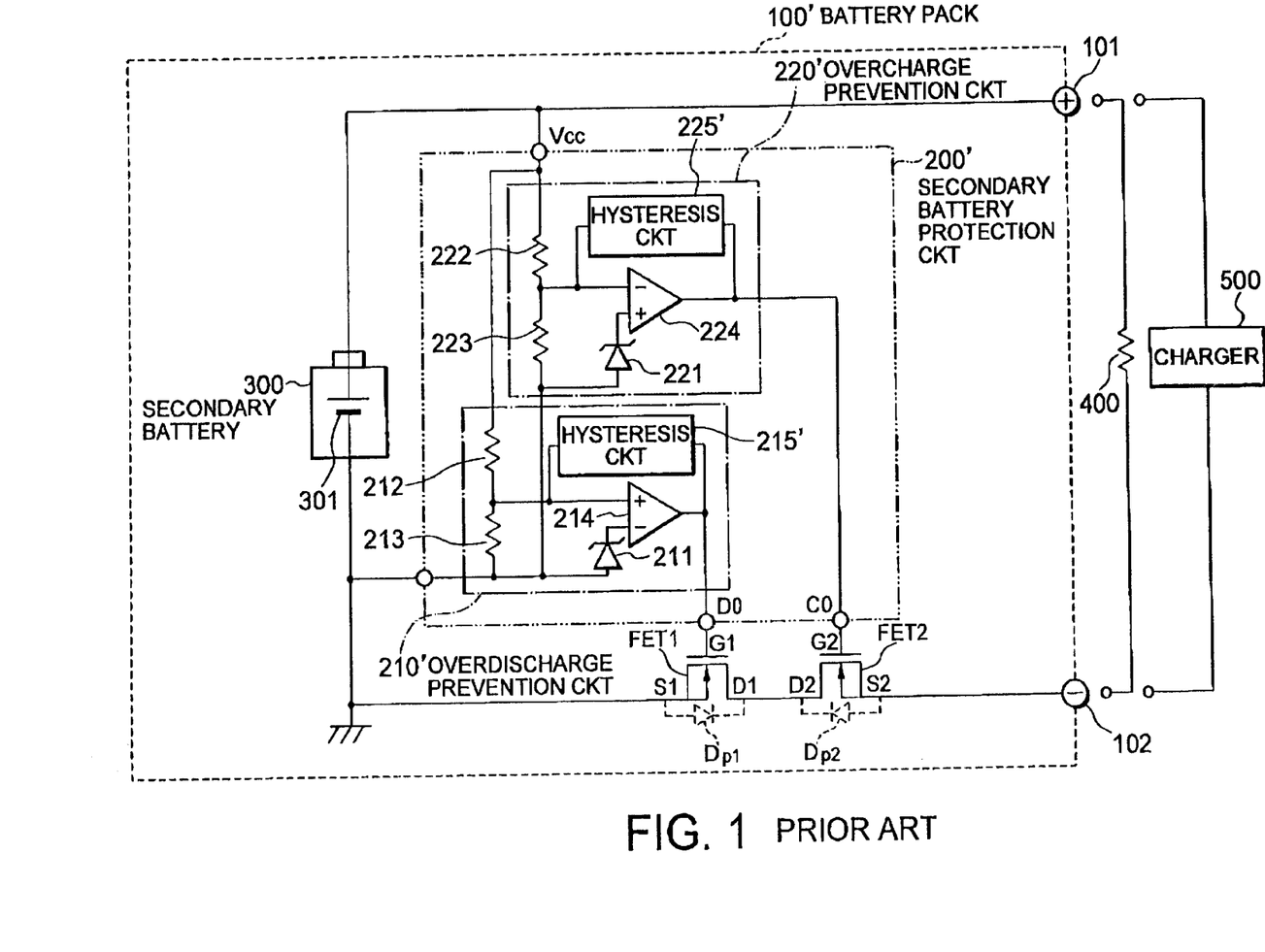
FIG. 1 is a block diagram of a conventional battery pack comprising a conventional secondary battery protection circuit.

Referring to FIG. 1, a conventional battery unit 100' comprising a conventional secondary battery protection circuit 200' will be described at first in order to facilitate an understanding of the present invention. Description will later be made about the conventional secondary battery protection circuit 200' on the basis of the above-mentioned prior art reference. Although the above-mentioned prior art reference does not illustrate a definite structure about a control arrangement, the description will be made on the analogy of structure of the control arrangement on the basis of description of specification thereof.

The battery unit 100' may be called a battery pack and has a positive electrode terminal 101 and a negative electrode terminal 102. The positive electrode terminal 101 and the negative electrode terminal 102 are also called external connection terminals. Between the positive electrode terminal 101 and the negative electrode terminal 102, a load 400 or a charger 500 are selectively connected.

The illustrated battery unit 100' comprises a secondary battery 300 including at least one lithium ion cell 301 (which is also called a unit cell). The secondary battery 300 is connected between a power source terminal and a ground terminal to generate a battery voltage Vcc. In other words, the secondary battery 300 has a cathode connected to the power source terminal and an anode connected to the ground terminal. The power source terminal is connected to the positive electrode terminal. The secondary battery 300 is connected in parallel with the secondary battery protection circuit 200'. The secondary battery protection circuit 200' comprises an overdischarge prevention circuit 210' and an overcharge prevention circuit 220'.

The overdischarge prevention circuit 210' is set with an overdischarge detection threshold voltage Vth(od). The overdischarge prevention circuit 210' compares the battery voltage Vcc with the overdischarge detection threshold voltage Vth(od). When the battery voltage Vcc is lower than the overdischarge detection threshold voltage Vth(od), the overdischarge prevention circuit 210' judges that the secondary battery 300 is put into an overdischarge condition to produce an overdischarge detected signal having a logic low level.

Specifically, the overdischarge prevention circuit 210' comprises a Zener diode 211, an overdischarge resistance potential dividing circuit consisting of two bleeder resistors 212 and 213, an overdischarge detection comparator 214, and an overdischarge hysteresis circuit 215'. The Zener diode 211 has an anode connected to the ground terminal and a cathode. The Zener diode 211 serves as an overdischarge reference voltage generating arrangement for generating an overdischarge reference voltage corresponding to the overdischarge detection threshold voltage Vth(od). The overdischarge resistance potential dividing circuit consists of the two bleeder resistors 212 and 213 which are connected in series with each other between the power source terminal and the ground terminal. The overdischarge resistance potential dividing circuit potential divides the battery voltage Vcc to produce an overdischarge potential divided voltage. The overdischarge detection comparator 214 has an inverting input terminal connected to the cathode of the Zener diode 211, a noninverting input terminal connected to the overdischarge resistance potential dividing circuit, and an output terminal. The overdischarge detection comparator 214 compares the overdischarge potential divided voltage with the overdischarge reference voltage. The overdischarge hysteresis circuit 215' is connected between the output terminal of the overdischarge detection comparator 214 and the noninverting input terminal of the overdischarge detection comparator 214. The overdischarge hysteresis circuit 215' defines an overdischarge hysteresis voltage Vhy(od). By adding the overdischarge hysteresis voltage Vhy(od) to the overdischarge detection threshold voltage Vth(od), an overdischarge return voltage (Vth(od)+Vhy(od)) is obtained.

When the overdischarge potential divided voltage is lower than the overdischarge reference voltage, namely, when the battery voltage Vcc is lower than the overdischarge detection threshold voltage Vth(od), the overdischarge detection comparator 214 produces the overdischarge detected signal having the logic low level. On the other hand, when battery voltage Vcc is higher than the overdischarge return voltage (Vth(od)+Vhy(od)), the overdischarge detection comparator 214 produces an overdischarge protection cancellation signal having a logic high level.

Likewise, the overcharge prevention circuit 220' is set with an overcharge detection threshold voltage Vth(oc). The overcharge prevention circuit 210' compares the battery voltage Vcc with the overcharge detection threshold voltage Vth(oc). When the battery voltage Vcc is higher than the overcharge detection threshold voltage Vth(oc), the overcharge prevention circuit 220' judges that the secondary battery 300 is put into an overcharge condition to produce an overcharge detected signal having a logic low level.

Specifically, the overcharge prevention circuit 220' comprises a Zener diode 221, an overcharge resistance potential dividing circuit consisting of two bleeder resistors 222 and 223, an overcharge detection comparator 224, and an overcharge hysteresis circuit 225'. The Zener diode 221 has an anode connected to the ground terminal and a cathode. The Zener diode 221 acts as an overcharge reference voltage generating arrangement for generating an overcharge reference voltage corresponding to the overcharge detection threshold voltage Vth(oc). The overcharge resistance potential dividing circuit potential consists of the two bleeder resistors 222 and 223 which are connected in series with each other between the power source terminal and the ground terminal. The overcharge resistance potential dividing circuit potential divides the battery voltage Vcc to produce an overcharge potential divided voltage. The overcharge detection comparator 224 has a noninverting input terminal connected to the cathode of the Zener diode 221, an inverting input terminal connected to the overcharge resistance potential dividing circuit, and an output terminal. The overcharge detection comparator 224 compares the overcharge potential divided voltage with the overcharge reference voltage. The overcharge hysteresis circuit 225' is connected between the output terminal of the overcharge detection comparator 224 and the inverting input terminal of the overcharge detection comparator 224. The overcharge hysteresis circuit 225' defines an overcharge hysteresis voltage Vhy(oc). By subtracting the overcharge hysteresis voltage Vhy(oc) from the overcharge detection threshold voltage Vth(oc), an overcharge return voltage (Vth(oc)–Vhy(oc)) is obtained.

When the overcharge potential divided voltage is higher than the overcharge reference voltage, namely, when the battery voltage Vcc is higher than the overcharge detection threshold voltage Vth(oc), the overcharge detection comparator 224 produces the overcharge detected signal having the logic low level. On the other hand, when the battery voltage Vcc is lower than the overcharge return voltage (Vth(oc)–Vhy(oc)), the overcharge detection comparator 224 produces an overcharge protection cancellation signal having a logic high level.

In addition, between the anode (an minus electrode) of the secondary battery 300 or the ground terminal and the negative electrode terminal 102, first and second field effect transistors FET1 and FET2 are connected in series with each other. The first field effect transistor FET1 is operable as a discharge control switch while the second field effect transistor FET2 is operable as a charge control switch. In the example being illustrated, each of the first and the second field effect transistors FET1 and FET2 consists of an n-channel metal oxide semiconductor field effect transistor (MOSFET). The first field effect transistor FET1 has a first source S1 connected to the anode of the secondary battery 300 or the ground terminal, a first gate G1 connected to the overdischarge prevention circuit 210', and a first drain D1. The first gate G1 of the first field effect transistor FET1 is operable as a first control terminal of the discharge control switch. The second field effect transistor FET2 has a second source S2 connected to the negative electrode terminal 102, a second gate G2 connected to the overcharge prevention circuit 220', and a second drain D2 connected to the first drain D1 of the first field effect transistor FET1. The second gate G2 of the second field effect transistor FET2 is operable as a second control terminal of the charge control switch. An arrangement of the first and the second field effect transistors FET1 and FET2 may be exchanged.

When the first gate G1 of the first field effect transistor FET1 is supplied with the overdischarge detected signal having the logic low level from the overdischarge prevention circuit 210', the first field effect transistor FET1 is turned off. On the other hand, when the first gate G1 of the first field effect transistor FET1 is supplied with the overdischarge protection cancellation signal having the logic high level from the overdischarge prevention circuit 210', the first field effect transistor FET1 is turned on. Similarly, when the second gate G2 of the second field effect transistor FET2 is supplied with the overcharge detected signal having the logic low level from the overcharge prevention circuit 220', the second field effect transistor FET2 is turned off. When the second gate G2 of the second field effect transistor FET2 is supplied with the overcharge protection cancellation signal having the logic high level from the overcharge prevention circuit 220', the second field effect transistor FET2 is turned on.

In the manner which is described in the above-mentioned prior art reference, the first field effect transistor FET1 has a first parasitic diode Dp1 while the second field effect transistor FET2 has a second parasitic diode Dp2. The first parasitic diode Dp1 is connected in parallel with the first field effect transistor FET1 so that a forward direction of the first parasitic diode Dp1 coincides with a charging direction of the secondary battery 300. That is, the first parasitic diode Dp1 has a first anode connected to the first source S1 of the first field effect transistor FET1 and a first cathode connected to the first drain D1 of the first field effect transistor FET1. The second parasitic diode Dp2 is connected in parallel with the second field effect transistor FET2 so that a forward direction of the second parasitic diode Dp2 coincides with a discharging direction of the secondary battery 300. That is, the second parasitic diode Dp2 has a second anode connected to the second source S2 of the second field effect transistor FET2 and a second cathode connected to the second drain D2 of the second field effect transistor FET2.

Figure 2:
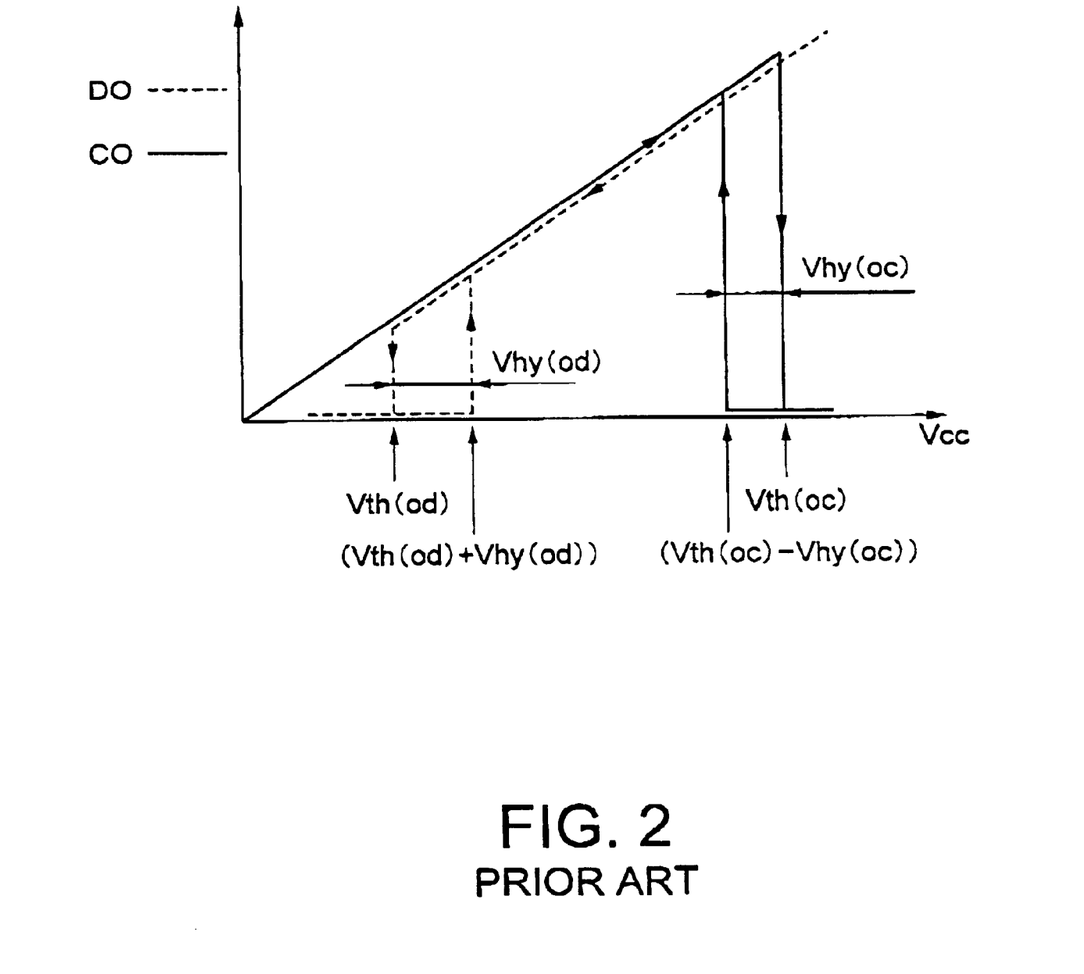
FIG. 2 is a view for use in describing operation of the secondary battery protection circuit illustrated in FIG. 1.

Referring now to FIG. 2 in addition to FIG. 1, description will be made as regards operation of the battery unit (the battery pack) 100' illustrated in FIG. 1. In FIG. 2, the abscissa represents the battery voltage Vcc and the ordinate represents an output DO of the overdischarge prevention circuit 210' or an output CO of the overcharge prevention circuit 220'. In FIG. 2, a broken line represents an output characteristic of the overdischarge prevention circuit 210' on discharging while a solid line represents an output characteristic of the overcharge prevention circuit 220' on charging. An operation on discharging will be first described and an operation on charging will be successively described.

On discharging of the battery pack 100', the load 400 is connected between the positive electrode terminal 101 and the negative electrode terminal 102. While the secondary battery 300 is discharged, as shown in the broken line in FIG. 2, the battery voltage Vcc of the secondary battery 300 becomes gradually low. When the battery voltage Vcc is finally lower than the overdischarge detection threshold voltage Vth(od), the overdischarge prevention circuit 210' produces the overdischarge detected signal having the logic low level. Responsive to the overdischarge detected signal, the first field effect transistor FET1 is turned off and thereby the overdischarge is prevented.

When an effect that the secondary battery 300 is put into an overdischarge condition is notified to a user by any notification arrangement, the user removes the load 400 from the external connection terminals 101 and 102 and connects the charger 500 for the load 400 with the external connection terminals 101 and 102. Accordingly, charging of the secondary battery 300 starts. In this event, a charging current flows through the first parasitic diode Dp1 in the first field effect transistor FET1. Thereafter, when the battery voltage Vcc of the secondary battery 300 is higher than the overdischarge return voltage (Vth(od)+Vhy(od)), the overdischarge prevention circuit 210' produces the overdischarge protection cancellation signal having the logic high level. Responsive to the overdischarge protection cancellation signal, the first field effect transistor FET1 is turned on.

Accordingly, energy is consumed in the first field effect transistor FET1 for a time duration from a time instant when the charger 500 is connected between the external connection terminals 101 and 12 to a time instant when the first field effect transistor FET1 is turned on. This is because the charging current flows through the first parasitic diode. Dp1 in the first field effect transistor FET1 for this time duration.

Now, in the manner which is described above, while charging of the secondary battery 300 is continued, the battery voltage Vcc of the secondary battery 300 becomes gradually high, as shown in the solid line in FIG. 2. When the battery voltage Vcc is finally higher than the overcharge detection threshold voltage Vth(oc), the overcharge prevention circuit 220' produces the overcharge detected signal having the logic low level. Responsive to the overcharge detected signal, the second field effect transistor FET2 is turned off and thereby the overcharge is prevented.

When an effect that the secondary battery 300 is put into an overcharge condition is notified to a user by any notification arrangement, the user decides that the charging is completed. Thereafter, the user removes the charger 500 from the external connection terminals 101 and 102 and connects the load 400 for the charger 500 with the external connection terminals 101 and 102. Accordingly, discharging of the secondary battery 300 starts. In this event, a discharging current flows through the second parasitic diode Dp2 in the second field effect transistor FET2. Thereafter, when the battery voltage Vcc of the secondary battery 300 is lower than the overcharge return voltage (Vth(oc)−Vhy(oc)), the overcharge prevention circuit 220' produces the overcharge protection cancellation signal having the logic high level. Responsive to the overcharge protection cancellation signal, the second field effect transistor FET2 is turned on.

Accordingly, energy is consumed in the second field effect transistor FET2 for a time duration from a time instant when the load 400 is connected between the external connection terminals 101 and 102 to a time instant when the second field effect transistor FET2 is turned on. This is because the discharging current flows through the second parasitic diode Dp2 in the second field effect transistor FET2 for the time duration.

As described above, in the conventional secondary battery protection circuit 200', on discharging where the load 400 is connected between the external connection terminals 101 and 102, when the first field effect transistor FET1 is turned off by detecting the overdischarge condition in the overdischarge prevention circuit 210', the first field effect transistor FET1 is immediately not turned on although the charger 500 is thereafter connected between the external connection terminals 101 and 102. That is, for a time interval determined by the overdischarge hysteresis voltage Vhy(od) defined by the overdischarge hysteresis circuit 215', the charging current continually flows through the first parasitic diode Dp1 in the first field effect transistor FET1. For this time interval, the energy is consumed in the first field effect transistor FET1. As a result, if this time interval is too long, heat generates in the first field effect transistor FET1 and it is therefore feared that destruction of the first field effect transistor FET1 is caused by the generated heat, as mentioned in the preamble of the instant specification.

In addition, in the conventional secondary battery protection circuit 200', on charging where the charger 500 is connected between the external connection terminals 101 and 102, when the second field effect transistor FET2 is turned off by detecting the overcharge condition in the overcharge prevention circuit 220', the second field effect transistor FET2 is immediately not turned on although the load 400 is thereafter connected between the external connection terminals 101 and 102. That is, for a time interval determined by the overcharge hysteresis voltage Vhy(oc) defined by the overcharge hysteresis circuit 225', the discharging current continually flows through the second parasitic diode Dp2 in the second field effect transistor FET2. For this time interval, the energy is consumed in the second field effect transistor FET2. As a result, if this time interval is too long, heat generates in the second field effect transistor FET2 and it is therefore feared that destruction of the second field effect transistor FET2 is caused by the generated heat, as mentioned also in the preamble of the instant specification.

Figure 3:
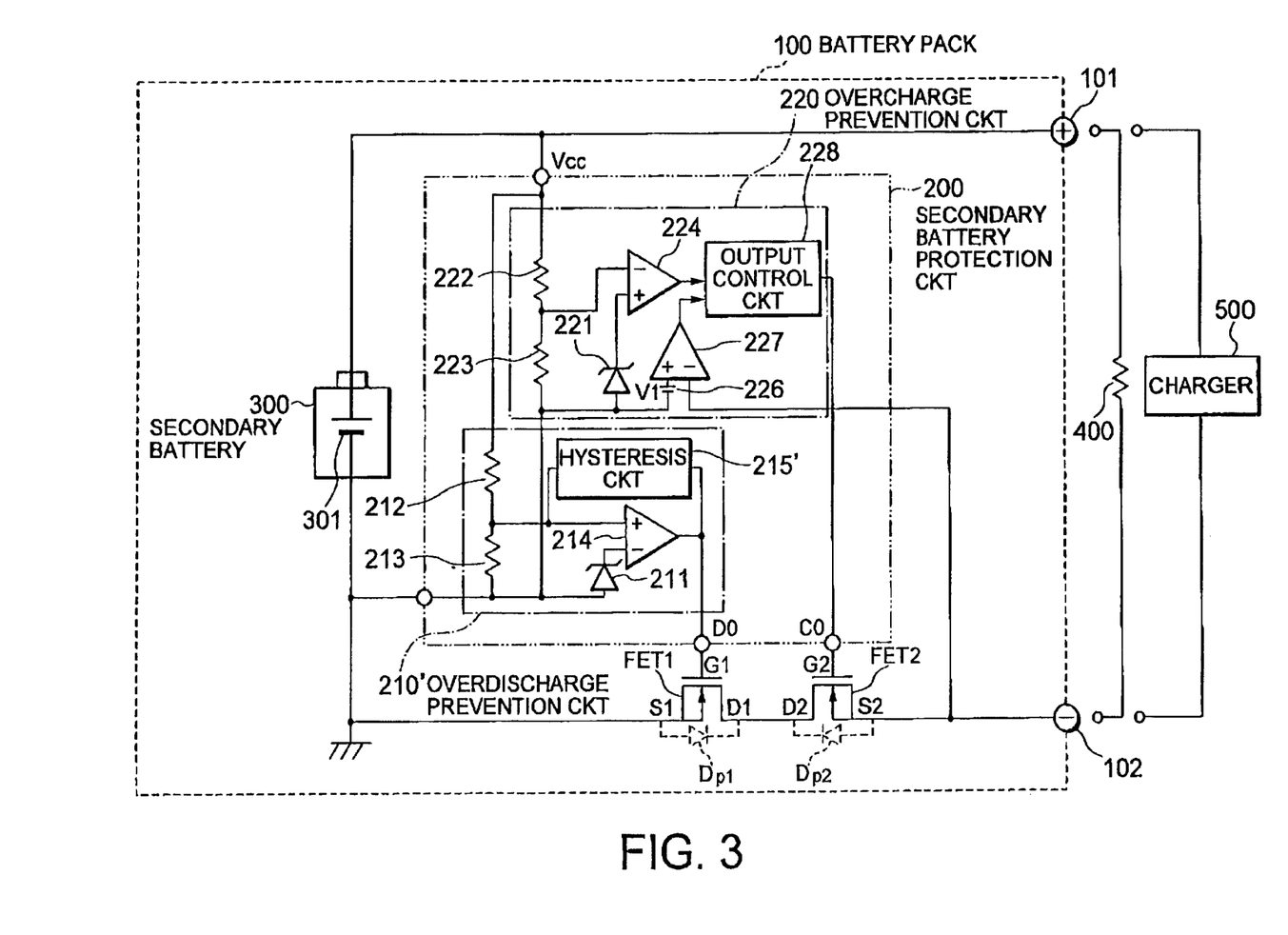
FIG. 3 is a block diagram of a battery pack comprising a secondary battery protection circuit according to a first embodiment of this invention.

Referring to FIG. 3, the description will proceed to a battery unit (battery pack) 100 comprising a secondary battery protection circuit 200 according to a first embodiment of this invention. The illustrated secondary battery protection circuit 200 is similar in structure and operation to the conventional secondary battery protection circuit 200' except that the overcharge prevention circuit is modified from that illustrated in FIG. 1 as will later become clear. The overcharge prevention circuit is therefore depicted at 220. In addition, the same reference symbols are attached to those having similar functions in those illustrated in FIG. 1 and description thereto is omitted for the purpose of simplification of the description.

The illustrated overcharge prevention circuit 220 is similar in structure and operation to the overcharge prevention circuit 220' illustrated in FIG. 1 except that the overcharge prevention circuit 220 comprises a voltage generating circuit 226, a discharge detection comparator 227, and an output control circuit 228 instead of the overcharge hysteresis circuit 225'.

The voltage generating circuit 226 generates a discharge detection threshold voltage V1. The discharge detection comparator 227 has a noninverting input terminal supplied with the discharge detection threshold voltage V1, an inverting input terminal connected to the negative electrode terminal 102, and an output terminal. The discharge detection comparator 227 compares the overcharge detection threshold voltage V1 with a potential of the negative electrode terminal 102 (or a potential difference between the ground terminal and the negative electrode terminal 102). When the potential of the negative electrode terminal 102 is higher than the discharge detection threshold voltage V1, the discharge detection comparator 227 judges that the secondary battery 300 is put into a discharge condition and produces a discharge detected signal. The output terminal of the discharge detection comparator 227 is connected to the output control circuit 228 which is connected to the output terminal of the overcharge detection comparator 224. The output control circuit 228 turns, on the basis of an output signal of the overcharge detection comparator 224 and an output signal of the discharge detection comparator 227, the second field effect transistor FET2 acting as the charge control switch on or off.

Specifically, supplied with the overcharge detected signal from the overcharge detection comparator 224, the output control circuit 228 produces a switch OFF control signal for turning the second field effect transistor FET2 off. On the other hand, supplied with the discharge detected signal from the discharge detection comparator 227, the output control circuit 228 produces a switch ON control signal for turning the second field effect transistor FET2 on. Such an output control circuit 228 may be, for example, implemented by a thysistor, a flip-flop, or the like.

Now, the description will proceed to operation of the battery pack 100 illustrated In FIG. 3. Although operation on charging is similar to that of the above-mentioned conventional battery pack 100', description thereto is omitted. The description will later be made as regards operation in a case where the overcharge prevention circuit 220 (the second field effect transistor FET2) is returned by starting discharge.

After charging of the secondary battery 300 by the charger 500 is completed, the load 400 for the charger 500 is connected between the positive electrode terminal 101 and the negative electrode terminal 102. Therefore, a discharging current flows from the secondary battery 300 through the load 400, the second field effect transistor FET2, and the first field effect transistor FET1. When the discharging current flows in the load 400, the potential of the negative electrode terminal 102 is higher than the discharge detection threshold voltage V1. Accordingly, the discharge detection comparator 227 produces the discharge detected signal. Responsive to the discharge detected signal, the output control circuit 228 produces the switch ON control signal. Responsive to the swtich ON control signal, the second field effect transistor FET2 is put into an ON state.

As described above, in the secondary battery protection circuit 200, the second field effect transistor FET2 is immediately put into the ON state when the load 400 is connected between the external connection terminals 101 and 102. Accordingly, useless energy is not consumed in the second field effect transistor FET2 and it is possible to prevent heat from generating in the second field effect transistor FET2. As a result, it is possible to prevent the second field effect transistor FET2 from destroying.

Figure 4:
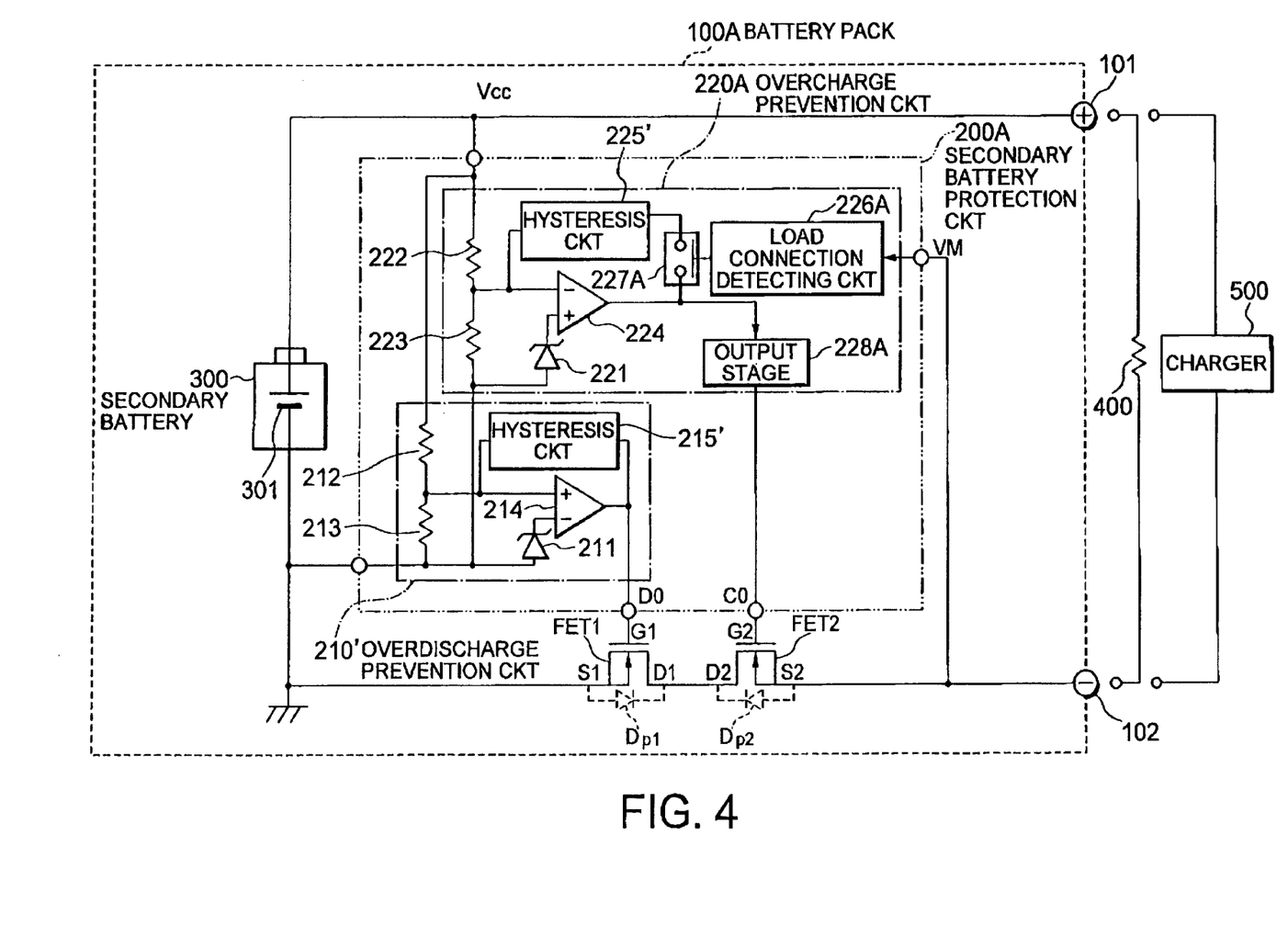
FIG. 4 is a block diagram of a battery pack comprising a secondary battery protection circuit according to a second embodiment of this invention.

Referring to FIG. 4, the description will proceed to a battery unit (battery pack) 100A comprising a secondary battery protection circuit 200A according to a second embodiment of this invention. The illustrated secondary battery protection circuit 200A is similar in structure and operation to the conventional secondary battery protection circuit 200' except that the overcharge prevention circuit is modified from that illustrated in FIG. 1 as will later become clear. The overcharge prevention circuit is therefore depicted at 220A. In addition, the same reference symbols are attached to those having similar functions in those illustrated in FIG. 1 and its description thereto is omitted for the purpose of simplification of the description.

The illustrated overcharge prevention circuit 220A is similar in structure and operation to the overcharge prevention circuit 220' illustrated in FIG. 1 except that the overcharge prevention circuit 220A further comprises a load connection detecting circuit 226A, a switch 227A, and an output stage 228A.

The load connection detecting circuit 226A is connected to the negative electrode terminal 102. The load connection detecting circuit 226A detects whether or not the load 400 is connected between the external connection terminals 101 and 102. When the load connection detecting circuit 226A detects that the load 400 is connected between the external connection terminals 101 and 102, the load connection detecting circuit 226A produces a load connection detected signal. The switch 227A is connected between the overcharge hysteresis circuit 225' and the output terminal of the overcharge detection comparator 224 and is supplied with the load connection detected signal from the load connection detecting circuit 226A. Responsive to an output of the load connection detecting circuit 226A, the switch 227A is turned on or off in the manner which be described as the description proceeds. The output stage 228A is located between the output terminal of the overcharge detection comparator 224 and the second gate G2 of the second field effect transistor FET2 serving as the charge control switch.

Now, the description will proceed to operation of the battery pack 100A illustrated in FIG. 4. Although operation on charging is similar to that of the above-mentioned conventional battery pack 100', description thereto is omitted. The description will later be made as regards operation in a case where the overcharge prevention circuit 220A (the second field effect transistor FET2) is returned by starting discharge.

Inasmuch as the load 400 is connected between the external connection terminals 101 and 102, the load connection detecting circuit 226A produces no load connection detected signal. Responsive to the no load connection detected signal, the switch 227A is put into an ON state. In this event, after charging of the secondary battery 300 by the charger 500 is completed, the load 400 for the charger 500 is connected between the positive electrode terminal 101 and the negative electrode terminal 102. Therefore, a discharging current flows from the secondary battery 300 through the load 400, the second field effect transistor FET2, and the first field effect transistor FET1. The load connection detecting circuit 226A detects that the load 400 is connected the external connection terminals 101 and 102 to produce the load connection detected signal. Responsive to the load connection detected signal, the switch is turned off. Therefore, hysteresis in the overcharge hysteresis circuit 225' is cancelled. Inasmuch as the potential divided voltage in the two bleeder resistors 222 and 223 is lower than the overcharge detection reference voltage generated by the Zener diode 221 due to the influence of an internal resistor of the secondary battery 300, the overcharge detection comparator 224 produces the overcharge protection cancellation signal having the logic high level. Responsive to the overcharge protection cancellation signal, the output stage 228A produces a switch ON control signal. Responsive to the switch ON control signal, the second field effect transistor FET2 is put into an ON state.

As described above, in the secondary battery protection circuit 200A also, in the similar manner as the above-mentioned secondary battery protection circuit 200, the second field effect transistor FET2 is immediately put into the ON state when the load 400 is connected between the external connection terminals 101 and 102. Accordingly, useless energy is not consumed in the second field effect transistor FET2 and it is possible to prevent heat from generating in the second field effect transistor FET2. As a result, it is possible to prevent the second field effect transistor FET2 from destroying.

Figure 5:
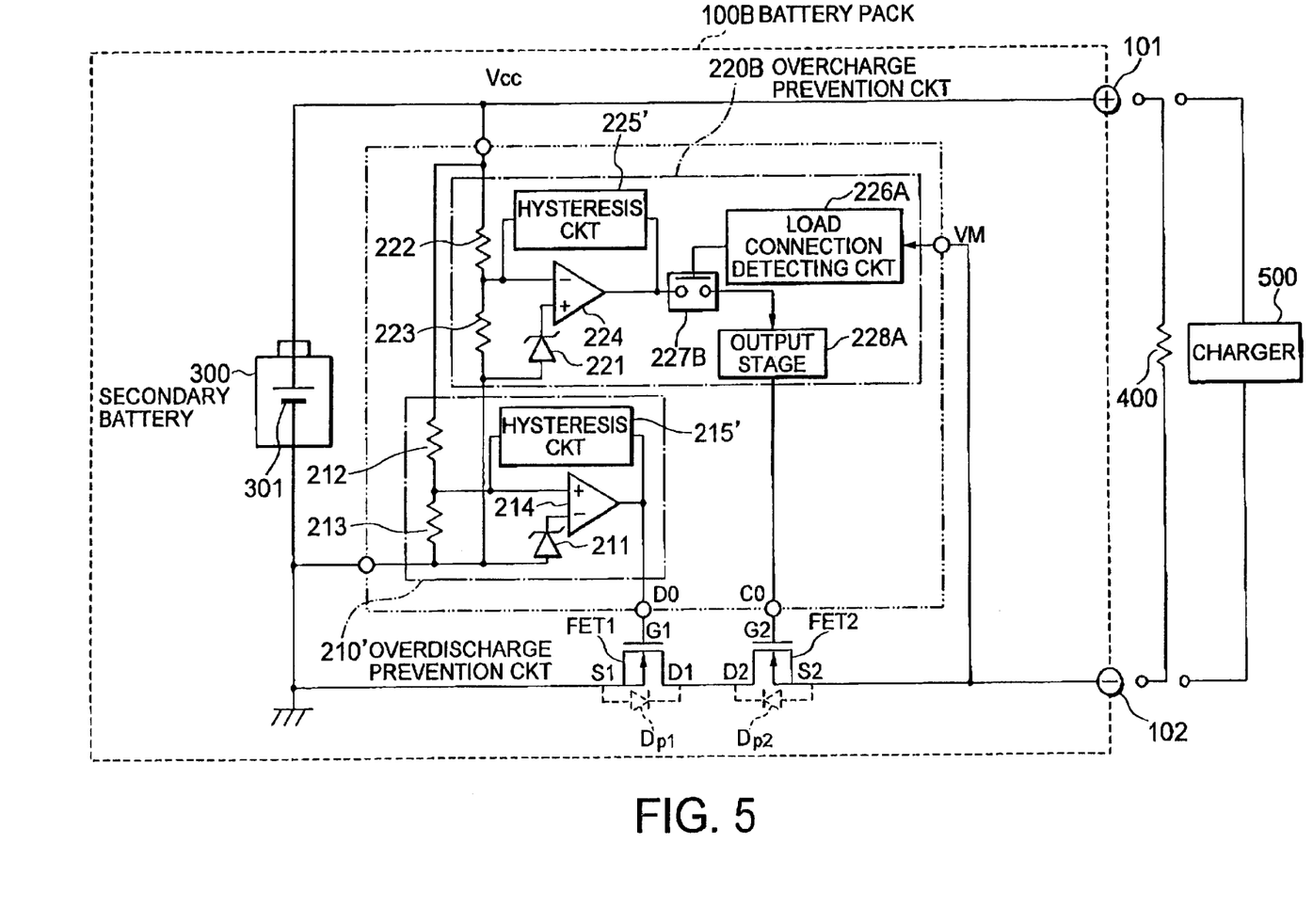
FIG. 5 is a block diagram of a battery pack comprising a secondary battery protection circuit according to a third embodiment of this invention.

Referring to FIG. 5, the description will proceed to a battery unit (battery pack) 100B comprising a secondary battery protection circuit 200B according to a third embodiment of this invention. The illustrated secondary battery protection circuit 200B is similar In structure and operation to the secondary battery protection circuit 200A except that the overcharge prevention circuit is modified from that illustrated in FIG. 4 as will later become clear. The overcharge prevention circuit is therefore depicted at 220B. In addition, the same reference symbols are attached to those having similar functions in those illustrated in FIG. 4 and description thereto is omitted for the purpose of simplification of the description.

The illustrated overcharge prevention circuit 220B is similar in structure and operation to the overcharge prevention circuit 220A illustrated in FIG. 4 except that an arrangement position of the switch is modified from that illustrated in FIG. 4 as will later become clear. The switch is therefore depicted at 227B. Specifically, the switch 227B is connected between the output terminal of the overcharge detection comparator 224 and an input terminal of the output stage 228A and is supplied with the load connection detected signal from the load connection detecting circuit 226A. Responsive to an output of the load connection detecting circuit 226A, the switch 227B is turned on or off in the manner which will described the description proceeds.

Now, the description will proceed to operation of the battery pack 100B illustrated in FIG. 5. Although operation on charging is similar to that of the above-mentioned conventional battery pack 100', description thereto is omitted. The description will later be made as regards operation in a case where the overcharge prevention circuit 220B (the second field effect transistor FET2) is returned by starting discharge.

Inasmuch as the load 400 is connected between the external connection terminals 101 and 102, the load connection detecting circuit 226A produces no load connection detected signal. Responsive to the no load connection detected signal, the switch 227B is put into an ON state. In this event, after charging of the secondary battery 300 by the charger 500 is completed, the load 400 for the charger 500 is connected between the positive electrode terminal 101 and the negative electrode terminal 102. Therefore, a discharging current flows from the secondary battery 300 through the load 400, the second field effect transistor FET2, and the first field effect transistor FET1. The load connection detecting circuit 226A detects that the load 400 is connected the external connection terminals 101 and 102 to produce the load connection detected signal. Responsive to the load connection detected signal, the switch 227B is turned off. Therefore, the output stage 228A produces a switch ON control signal. Responsive to the switch ON control signal, the second field effect transistor FET2 is put into an ON state.

As described above, in the secondary battery protection circuit 200B, the second field effect transistor FET2 is immediately put into the ON state when the load 400 is connected between the external connection terminals 101 and 102. Accordingly, useless energy is not consumed in the second field effect transistor FET2 and it is possible to prevent heat from generating in the second field effect transistor FET2. As a result, it is possible to prevent the second field effect transistor FET2 from destroying.

Figure 6:
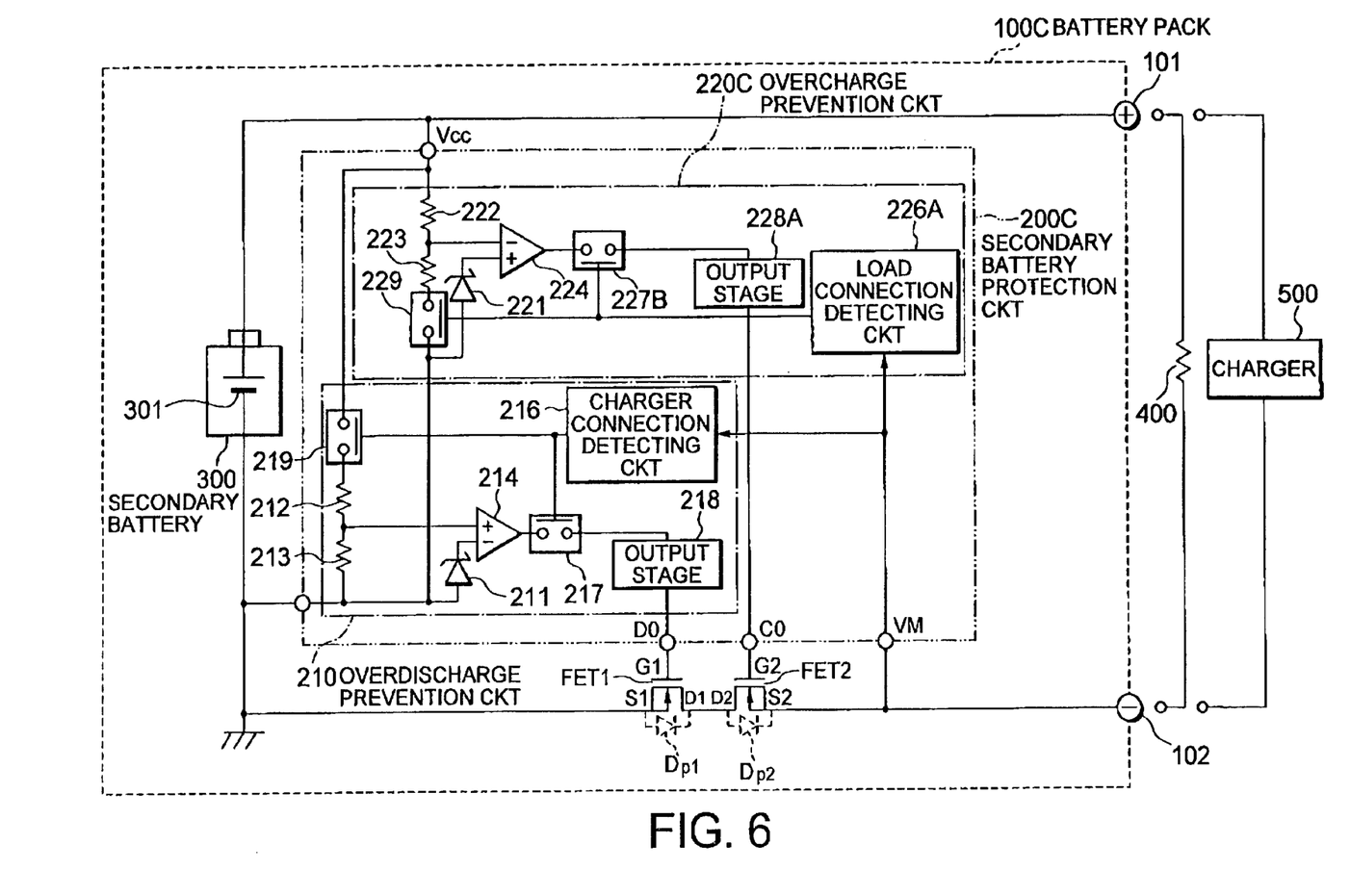
FIG. 6 is a block diagram of a battery pack comprising a secondary battery protection circuit according to a fourth embodiment of this invention.

Referring to FIG. 6, the description will proceed to a battery unit (battery pack) 100C comprising a secondary battery protection circuit 200C according to a fourth embodiment of this invention. The illustrated secondary battery protection circuit 200C is similar in structure and operation to the conventional secondary battery protection circuit 200' except that the overdischarge prevention circuit and the overcharge prevention circuit are modified from those illustrated in FIG. 1 as will later become clear. The overdischarge prevention circuit and the overcharge prevention circuit are therefore depicted at 210 and 220C. In addition, the same reference symbols are attached to those having similar functions in those illustrated in FIG. 1 and description thereto is omitted for the purpose of simplification of the description.

In addition, other reference voltage generating circuits may be used in lieu of the Zener diodes 211 and 221.

The Illustrated overdischarge prevention circuit 210 is similar in structure and operation to the overdischarge prevention circuit 210' illustrated in FIG. 1 except that the overdischarge prevention circuit 210 comprises a charger connection detecting circuit 216, a first overdischarge control switch 217, an overdischarge control output stage 218, and a second overdischarge control switches 219 in lieu of the overdischarge hysteresis circuit 215'.

The charger connection detecting circuit 216 is connected to the negative electrode terminal 102 and detects whether or not the charger 500 is connected between the external connection terminals 101 and 102. When the charger 500 is connected between the external connection terminals 101 and 102, the charger connection detecting circuit 216 produces a charger connection detected signal. The first overdischarge control switch 217 has an end connected to the output terminal of the overdischarge detection comparator 214 and another end connected to an input terminal of the overdischarge control output stage 218. The second overdischarge control switch 219 is connected between the overdischarge resistor potential dividing circuit and the power source terminal. In the manner which will later become clear, the first and the second overdischarge control switches 217 and 219 are turned on or off under the control of the charger connection detecting circuit 216. The overdischarge control output stage 218 is disposed between the other end of the first overdischarge control switch 217 and the first gate G1 of the first field effect transistor FET1 serving as the discharge control switch.

On the other hand, the illustrated overcharge prevention circuit 220C is similar in structure and operation to the overcharge prevention circuit 220' illustrated in FIG. 1 except that the overcharge prevention circuit 220C comprises the load connection detecting circuit 226A, a first overcharge control switch 227B, an overcharge control output stage 228A, and a second overcharge control switches 229 instead of the overcharge hysteresis circuit 225'.

The load connection detecting circuit 226A is connected to the negative electrode terminal 102 and detects whether or not the load 400 is connected between the external connection terminals 101 and 102. When the load 400 is connected between the external connection terminals 101 and 102, the load connection detecting circuit 226A produces a load connection detected signal. The first overcharge control switch 227B has an end connected between the output terminal of the overcharge detection comparator 224 and another end connected to an input terminal of the overcharge control output stage 228A. The second overcharge control switch 229 is connected between the overcharge resistor potential dividing circuit and the ground terminal. In the manner which will later become clear, the first and the second overcharge control switches 227B and 229 are turned on or off under the control of the load connection detecting circuit 226A. The overcharge control output stage 228A is disposed between the other end of the first overcharge control switch 227B and the second gate G2 of the second field effect transistor FET2 serving as the charge control switch.

Figure 7:
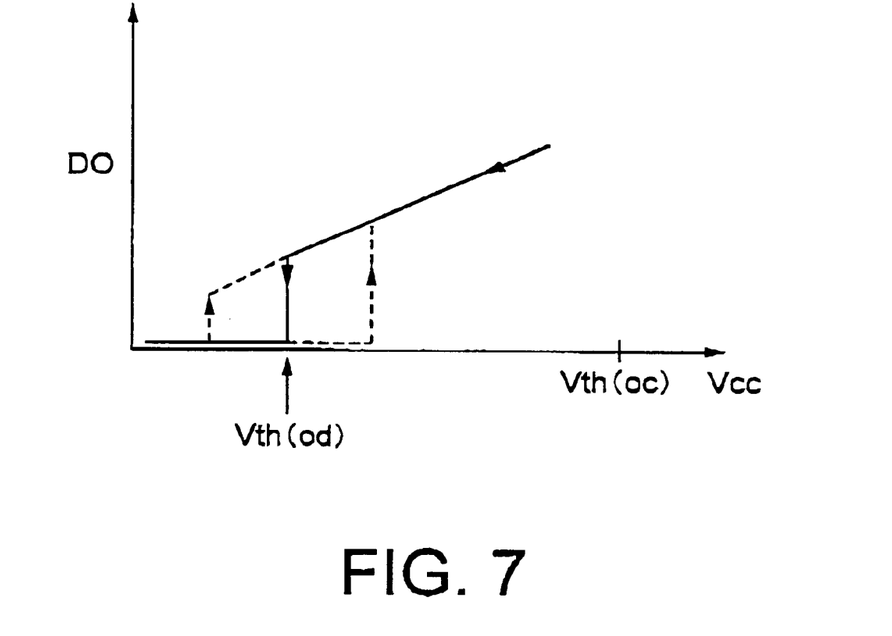
FIG. 7 is a view for use in describing an operation for duration from discharging to returning in the battery pack illustrated in FIG. 6.
Figure 8:
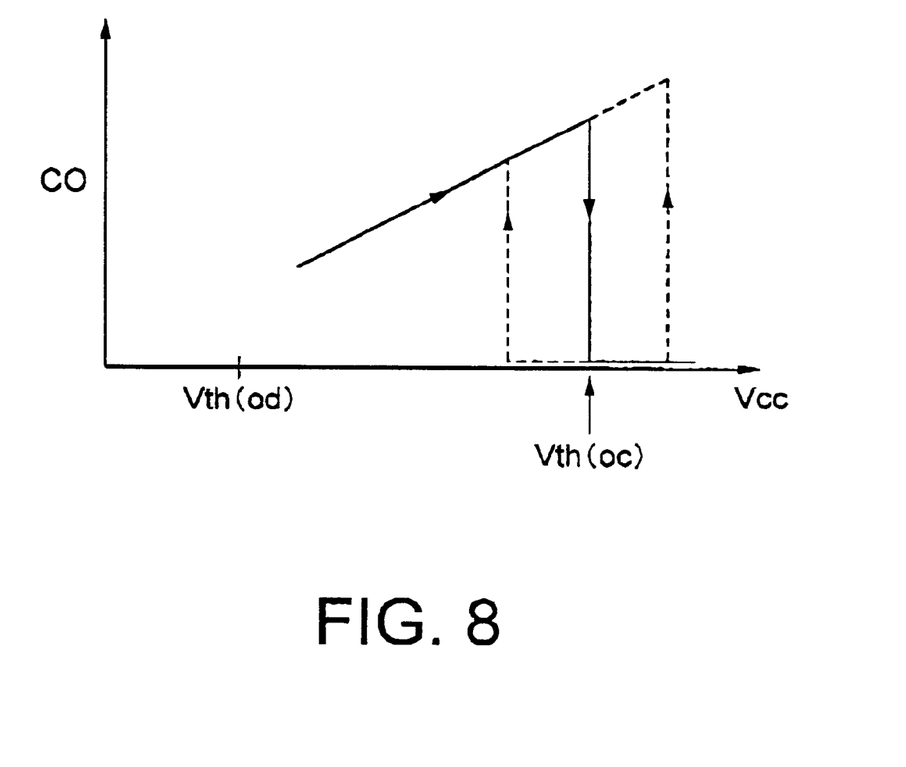
FIG. 8 is a view for use in describing another operation for duration from charging to returning in the battery pack illustrated in FIG. 6.

Referring now to FIGS. 7 and 8 in addition to FIG. 6, the description will proceed to operation of the battery pack 100C illustrated in FIG. 6. In FIG. 7, the abscissa represents the battery voltage Vcc and the ordinate represents an output DO of the overdischarge prevention circuit 210. FIG. 7 represents an output characteristic of the overdischarge prevention circuit 210 on discharging. In FIG. 8, the abscissa represents the battery voltage Vcc and the ordinate represents an output CO of the overcharge prevention circuit 220C. FIG. 8 represents an output characteristic of the overcharge prevention circuit 220C on charging.

Referring to FIG. 7, the description will first proceed to an operation for a duration from discharging to returning. Subsequently referring to FIG. 8, the description will proceed to another operation for a duration from charging to returning.

Referring to FIG. 6 in addition to FIG. 7, on discharging of the secondary battery 300 or at a discharging mode in the secondary battery 300, the load 400 is connected between the positive electrode terminal 101 and the negative electrode terminal 102. Inasmuch as the charger connection detecting circuit 216 detects that the charger 500 is not connected between the external connection terminals 101 and 102, the charger connection detecting circuit 216 produces no charger connection detected signal. Responsive to the no charger connection detected signal, both the first and the second overdischarge control switches 217 and 219 are put into an ON state.

In addition, inasmuch as the load connection detecting circuit 226A detects that the load 400 is connected between the external connection terminals 101 and 102, the load connection detecting circuit 226A produces the load connection detected signal. Responsive to the load connection detected signal, the first and the second overcharge control switches 227B and 229 are forcibly put into an OFF state. Therefore, the overcharge control output stage 228A delivers a charge switch ON control signal to the second gate G2 of the second field effect transistor FET2. Responsive to the charge switch ON control signal, the second field effect transistor FET2 is put into an ON state.

In this event, inasmuch as the battery voltage Vcc of the secondary battery 300 is still higher than the overdischarge detection threshold voltage Vth(od), the overdischarge detection comparator 214 produces the overdischarge protection cancellation signal having the logic high level. Responsive to the overdischarge protection cancellation signal, the overdischarge control output stage 218 delivers a discharge switch ON control signal to the first gate G1 of the first field effect transistor FET1. Responsive to the discharge switch ON control signal, the first field effect transistor FET1 is put into an ON state.

Now, while the secondary battery 300 discharges, as shown in an arrow of FIG. 7, the battery voltage Vcc of the secondary battery 300 gradually becomes low. When the battery voltage Vcc is finally lower than the overdischarge detection threshold voltage Vth(od), the overdischarge detection comparator 214 produces the overdischarge detected signal having the logic low level. Responsive to the overdischarge detected signal, the overdischarge control output stage 218 delivers a discharge switch OFF control signal to the first gate G1 of the first field effect transistor FET1. Responsive to the discharge switch OFF control signal, the first field effect transistor FET1 is turned off and thereby the overdischarge is prevented.

When an effect that the secondary battery 300 is put into an overdischarge condition is notified to a user by any notification arrangement, the user removes the load 400 from the external connection terminals 101 and 102 and connects the charger 500 for the load 400 with the external connection terminals 101 and 102. Accordingly, charging of the secondary battery 300 starts. In other words, although the battery voltage Vcc is higher than the overdischarge detection threshold voltage Vth(od) due to an internal resistor of the secondary battery 300 in a state where the load 400 is removed, the first field effect transistor FET1 is not turned on. That is, so far as the charger 500 is not connected between the external connection terminals 101 and 102, the first field effect transistor FET1 is not turned on.

When the charger connection detecting circuit 216 detects that the charger 500 is connected between the external connection terminals 101 and 102, the charger connection detecting circuit 216 produces the charger connection detected signal. Responsive to the charger connection detected signal, the first and the second overdischarge control switches 217 and 219 are forcibly put into an OFF state. Therefore, the ovedischarge control output stage 218 delivers the discharge switch ON control signal to the first gate G1 of the first field effect transistor FET1. Responsive to the discharge switch ON control signal, the first field effect transistor FET1 is put into the ON state.

In the manner which is described above, when the charger 500 is connected between the external connection terminals 101 and 102, the first field effect transistor FET1 is immediately and forcibly put into the ON state. Accordingly, useless energy is not consumed in the first field effect transistor FET1 and it is possible to prevent heat from generating in the first field effect transistor FET1. As a result, it is possible to prevent the first field effect transistor FET1 from destroying.

In addition, whether the battery voltage Vcc of the secondary battery 300 is lower or higher than the overdischarge detection threshold voltage Vth(od), the first field effect transistor FET1 is put into the ON state so long as the charger 500 is connected between the external connection terminal 101 and 102. Accordingly, it is possible to charge the secondary battery 300. On the other hand, it will be assumed that the load 400 is erroneously connected between the external connection terminals 101 and 102 in a state where the battery voltage Vcc of the secondary battery 300 is lower than the overdischarge detection threshold voltage Vth(od). In this event, inasmuch as the overdischarge prevention circuit 210 delivers the discharge switch OFF control signal to the first gate G1 of the first field effect transistor FET1, the first field effect transistor FET1 is held in the OFF state, and it is therefore impossible to discharge the secondary battery 300.

Referring to FIG. 6 in addition to FIG. 8, on charging of the secondary battery 300 or at a charging mode in the secondary battery 300, the charger 500 is connected between the positive electrode terminal 101 and the negative electrode terminal 102. Inasmuch as the load connection detecting circuit 226A detects that the load 400 is not connected between the external connection terminals 101 and 102, the load connection detecting circuit 226A produces no load connection detected signal. Responsive to the no load connection detected signal, both the first and the second overcharge control switches 227B and 229 are put into an ON state.

In addition, inasmuch as the charger connection detecting circuit 216 detects that the charger 500 is connected between the external connection terminals 101 and 102, the charger connection detecting circuit 216 produces the charger connection detected signal. Responsive to the charger connection detected signal, both the first and the second overdischarge control switches 217 and 219 are forcibly put into an OFF state. Therefore, the overdischarge control output stage 218 delivers the discharge switch ON control signal to the first gate G1 of the first field effect transistor FET1. Responsive to the discharge switch ON control signal, the first field effect transistor FET1 is put into the ON state.

In this event, inasmuch as the battery voltage Vcc of the secondary battery 300 is still lower than the overcharge detection threshold voltage Vth(oc), the overcharge detection comparator 224 produces the overcharge protection cancellation signal having the logic high level. Responsive to the overcharge protection cancellation signal, the overcharge control output stage 228 delivers the charge switch ON control signal to the second gate G2 of the second field effect transistor FET2. Responsive to the charge switch ON control signal, the second field effect transistor FET2 is put into the ON state.

Now, while the secondary battery 300 charges, as shown in an arrow of FIG. 8, the battery voltage Vcc of the secondary battery 300 gradually becomes high. When the battery voltage Vcc is finally higher than the overcharge detection threshold voltage Vth(oc), the overcharge detection comparator 224 produces the overcharge detected signal having the logic low level. Responsive to the overcharge detected signal, the overcharge control output stage 228A delivers the charge switch OFF control signal to the second gate G2 of the second field effect transistor FET2. Responsive to the charge switch OFF control signal, the second field effect transistor FET2 is turned off and thereby the overcharge is prevented.

When an effect that the secondary battery 300 is put into an overcharge condition is notified to the user by any notification arrangement, the user removes the charger 500 from the external connection terminals 101 and 102 and connects the load 400 for the charger 500 with the external connection terminals 101 and 102. Accordingly, discharging of the secondary battery 300 starts. In other words, although the battery voltage Vcc is lower than the overcharge detection threshold voltage Vth(oc) due to the internal resistor of the secondary battery 300 in a state where the charger 500 is removed, the second field effect transistor FET2 is not turned on. That is, so far as the load 400 is not connected between the external connection terminals 101 and 102, the second field effect transistor FET2 is not turned on.

When the load connection detecting circuit 226A detects that the load 400 is connected between the external connection terminals 101 and 102, the load connection detecting circuit 226A produces the load connection detected signal. Responsive to the load connection detected signal, both the first and the second overcharge control switches 227B and 229 are forcibly put into an OFF state. Therefore, the overcharge control output stage 228A delivers the charge switch ON control signal to the second gate G2 of the second field effect transistor FET2. Responsive to the charge switch ON control signal, the second field effect transistor FET2 is put into the ON state.

In the manner which is described above, when the load 400 is connected between the external connection terminals 101 and 102, the second field effect transistor FET2 is immediately and forcibly put into the ON state. Accordingly, useless energy is not consumed in the second field effect transistor FET2 and it is possible to prevent heat from generating in the second field effect transistor FET2. As a result, it is possible to prevent the second field effect transistor FET2 from destroying.

In addition, whether the battery voltage Vcc of the secondary battery 300 is higher or lower than the overcharge detection threshold voltage Vth(oc), the second field effect transistor FET2 is put into the ON state so long as the load 400 is connected between the external connection terminal 101 and 102. Accordingly, it is possible to discharge the secondary battery 300. On the other hand, it will be presumed that the charger 500 is erroneously connected between the external connection terminals 101 and 102 in a state where the battery voltage Vcc of the secondary battery 300 is higher than the overcharge detection threshold voltage Vth(oc). In this event, inasmuch as the overcharge prevention circuit 220C delivers the charge switch OFF control signal to the second gate G2 of the second field effect transistor FET2, the second field effect transistor FET2 is held In the OFF state, and it is therefore impossible to charge the secondary battery 300.

In addition, the fourth embodiment of this invention may be applicable to a field effect transistor FET with no parasitic diode.

Figure 9:
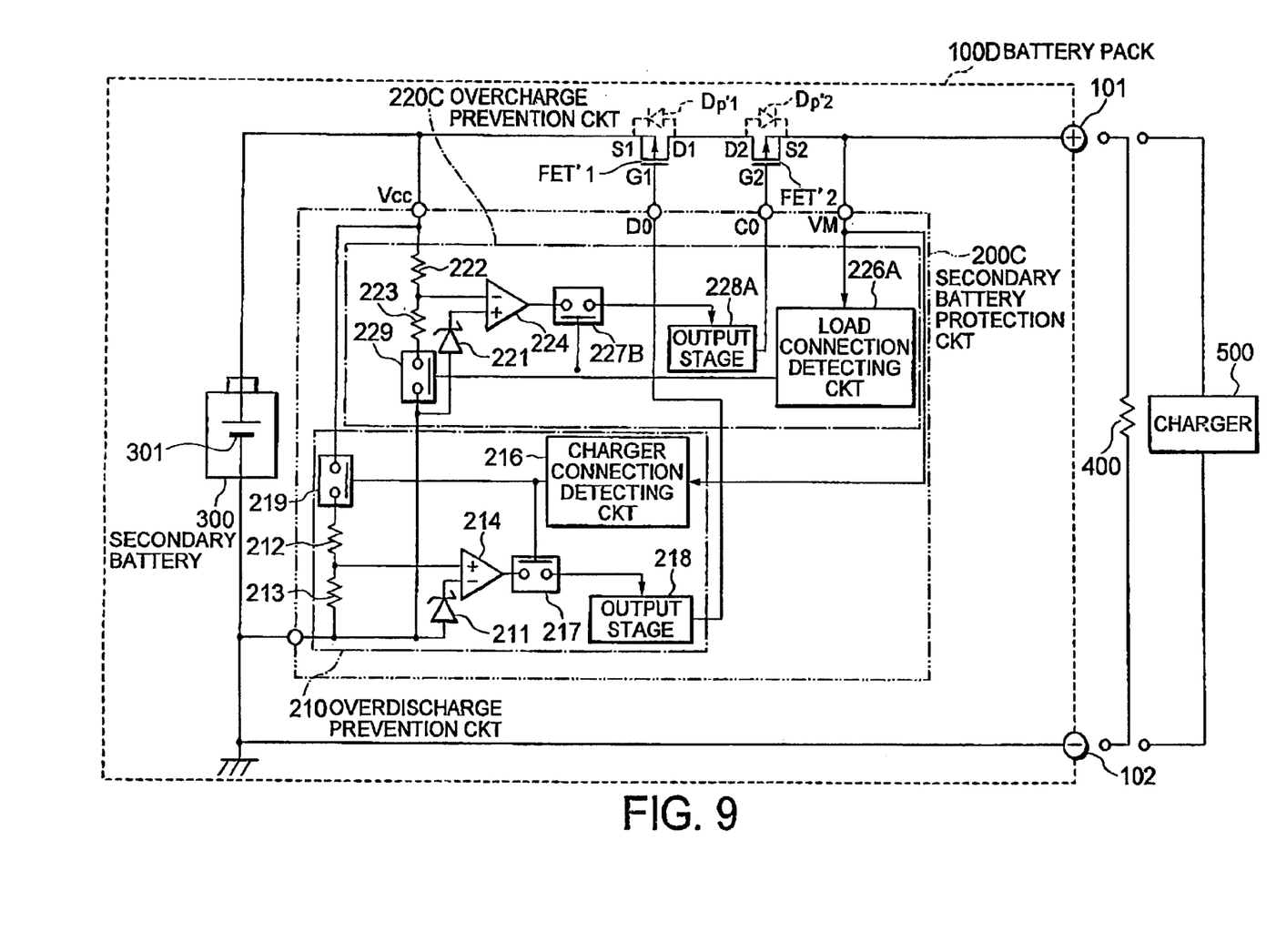
FIG. 9 is a block diagram of another battery pack comprising the secondary battery protection circuit according to the fourth embodiment of this invention.

Referring to FIG. 9, the description will proceed to another battery unit (battery pack) 100D comprising the secondary battery protection circuit 200C according to the fourth embodiment of this invention. The illustrated battery pack 100D is similar in structure and operation to the battery pack 100C illustrated in FIG. 6 except that the first and the second field effect transistors are modified from those illustrated in FIG. 6 as will later become clear. The first and the second field effect transistors are therefore depicted at FET'1 and Fet'2, respectively. In addition, the same reference symbols are attached to those having similar functions in those illustrated in FIG. 6 and description thereto is omitted for the purpose of simolification of the description.

Although the first and the second filed effect transistors FET1 and FET2 illustrated in FIG. 6 are connected between the ground terminal and the negative electrode terminal 102, the first and the second field effect transistors FET'1 and FET'2 are connected between the power source terminal and the positive electrode terminal 101.

More specifically, each of the first and the second field effect transistors FET'1 and FET'2 consists of a p-channel metal oxide semiconductor field effect transistor (MOSFET). The first field effect transistor FET'1 has a first source S1 connected to the cathode of the secondary battery 300 or the power source terminal, a first gate G1 connected to the overdischarge prevention circuit 210, and a first drain D1. The first gate G1 of the first field effect transistor FET'1 is operable as a first control terminal of the discharge control switch. The second field effect transistor FET'2 has a second source S2 connected to the positive electrode terminal 101, a second gate G2 connected to the overchage prevention circuit 220C, and a second drain D2 connected to the first drain D1 of the first field effect transistor FET'1. The second gate G2 of the second field effect transistor FET'2 is operable as a second control terminal of the charge control switch. An arrangement of the first and the second field effect transistors FET'1 and FET'2 may be exchanged.

The first field effect transistor FET'1 has a first parasitic diode Dp'1 while the second field effect transistor FET'2 has a second parasitic diode Dp'2. The first parasitic diode Dp'1 is connected in parallel with the first field effect transistor FET'1 so that a forward direction of the first parasitic diode Dp'1 coinsides with a charging direction of the secondary battery 300. That is, the first parasitic diode Dp'1 has a first anode connected to the first source S1 of the first field effect transistor FET'1 and a first cathode connected to the first drain D1 of the first field effect transistor FET'1. The second parasitic diode Dp'2 is connected in parallel with the second field effect transistor FET'2 so that a forward direction of the parasitic diode Dp'2 coindides with a discharging direction of the second battery 300. That is, the second parasitic diode Dp'2 has a second anode connected to the second source S2 of the second field effect transistor FET'2 and a second cathode connected to the second drain D2 of the second field effect transistor FET'2.

Inasmuch as operation of the battery pack 100D is similar to that of the battery pack 100C illustrated in FIG. 6, the description for the operation of the battery pack 100D is omitted.

While this invention has thus far been described in conjunction with preferred embodiments thereof, it will now be readily possible for those skilled in the art to put this invention into various other manners. For example, the secondary battery protection circuit according to a first aspect of this invention may comprise structure which is capable of immediately turning a discharge control switch on when a load is connected. In addition, the secondary battery protection circuit according to a second aspect of this invention may comprise structure which is capable of returning from overdischarge by immediately and forcibly turning a discharge control switch on when a charger is connected on discharging and which is capable of returning from overcharge by immediately and forcibly turning a charge control switch on when a load is connected on charging. Although each reference voltage generating circuit comprises only the Zener diode in the above-mentioned embodiments, the reference voltage generating circuit may comprise not only the Zener diode but also another peripheral circuit elements.

What is claimed is:

1. A method of protecting a secondary battery by controlling, by turning a charge control switch on and off, a charging current flowing through said secondary battery from a charger connected between external connection terminals, said secondary battery generating a battery voltage, said method comprising the steps of:
   turning said charge control switch off when said battery voltage is higher than an overcharge detection threshold voltage; and
   immediately turning said charge control switch on when a load for said charger is connected between said external connection terminals.

2. A secondary battery protection circuit for protecting a secondary battery by controlling, by turning a charge control switch on and off, a charging current flowing through said secondary battery from a charger connected between external connection terminals, said secondary battery being connected between a power source terminal and a ground terminal to generate a battery voltage, said secondary battery protection circuit comprising:
   switch off means for turning said charge control switch off when said battery voltage is higher than an overcharge detection threshold voltage; and
   switch on means for immediately turning said charge control switch on when a load for said charger is connected between said external connection terminals.

3. A secondary battery protection circuit as claimed in claim 2, wherein said charge control switch consists of a n-channel field effect transistor having a drain connected to said ground terminal and a source connected to a negative electrode terminal which is one of said external connection terminals.

4. A secondary battery protection circuit as claimed in claim 2, wherein said switch off means comprises:
   overcharge reference voltage generating means for generating an overcharge reference voltage corresponding to said overcharge detection threshold voltage;
   an overcharge resistance potential dividing circuit for dividing said battery voltage to produce an overcharge potential divided voltage;
   an overcharge detection comparator for comparing said overcharge potential divided voltage with said overcharge reference voltage, said overcharge detection comparator producing an overcharge detected signal when said overcharge potential divided voltage is higher said the overcharge reference voltage; and
   means, connected to an output terminal of said overcharge detection comparator, for supplying, in response to said overcharge detected signal, a switch ON control signal to a control terminal of said charge control switch,
   said switch on means comprising:
   a voltage generating circuit for generating a discharge detection threshold voltage;
   a discharge detection comparator comparing said overcharge detection threshold voltage with a potential of a negative electrode terminal which is one of said external connection terminals, said discharge detection comparator producing a discharge detected signal when the potential of said negative electrode terminal is higher than said discharge detection threshold voltage; and
   means, connected to an output terminal of said discharge detection comparator, for supplying, in response to said discharge detected signal, a switch ON control signal to the control terminal of said charge control switch.

5. A secondary battery protection circuit as claimed in claim 4, wherein said overcharge reference voltage generating means comprises a Zener diode.

6. A secondary battery protection circuit as claimed in claim 4, wherein said overcharge resistance potential dividing circuit consists of bleeder resistors connected in series with each other between said power source terminal and said ground terminal.

7. A secondary battery protection circuit as claimed in claim 2, wherein said switch off means comprises:
   overcharge reference voltage generating means for generating an overcharge reference voltage corresponding to said overcharge detection threshold voltage;
   an overcharge resistance potential dividing circuit for dividing said battery voltage to produce an overcharge potential divided voltage;
   an overcharge detection comparator for comparing said overcharge potential divided voltage with said overcharge reference voltage, said overcharge detection comparator producing an overcharge detected signal when said overcharge potential divided voltage is higher said the overcharge reference voltage;

an overcharge hysteresis circuit, connected to an inverting input terminal of said overcharge detection comparator, for defining an overcharge hysteresis voltage; and means, connected to an output terminal of said overcharge detection comparator, for supplying, in response to said overcharge detected signal, a switch ON control signal to a control terminal of said charge control switch, said switch on means comprising:

a load connection detecting circuit, connected to a negative electrode terminal which is one of said external connection terminals, for detecting whether or not said load is connected between said external connection terminal, said load connection detecting circuit producing a load connection detected signal when said load connection detecting circuit detects that said load is connected between said external connection terminals;

a switch, connected between said overcharge hysteresis circuit and the output terminal of said overcharge detection comparator, said switch being turned off in response to said load connection detected signal to cancel hysteresis in said overcharge hysteresis circuit and to make said overcharge detection comparator produce an overcharge protection cancellation signal; and means, connected to the output terminal of said overcharge detection comparator, for supplying, in response to said overcharge protection cancellation signal, a switch ON control signal to the control terminal of said charge control switch.

8. A secondary battery protection circuit as claimed in claim 7, wherein said overcharge reference voltage generating means comprises a Zener diode.

9. A secondary battery protection circuit as claimed in claim 7, wherein said overcharge resistance potential dividing circuit consists of bleeder resistors connected in series with each other between said power source terminal and said ground terminal.

10. A secondary battery protection circuit as claimed in claim 2, wherein said switch off means comprises:

overcharge reference voltage generating means for generating an overcharge reference voltage corresponding to said overcharge detection threshold voltage;

an overcharge resistance potential dividing circuit for dividing said battery voltage to produce an overcharge potential divided voltage;

an overcharge detection comparator for comparing said overcharge potential divided voltage with said overcharge reference voltage, said overcharge detection comparator producing an overcharge detected signal when said overcharge potential divided voltage is higher said the overcharge reference voltage;

an overcharge hysteresis circuit, connected between an inverting input terminal and an output terminal of said overcharge detection comparator, for defining an overcharge hysteresis voltage; and means, connected to the output terminal of said overcharge detection comparator, for supplying, in response to said overcharge detected signal, a switch ON control signal to a control terminal of said charge control switch, said switch on means comprising:

a load connection detecting circuit, connected to a negative electrode terminal which is one of said external connection terminals, for detecting whether or not said load is connected between said external connection terminal, said load connection detecting circuit producing a load connection detected signal when said load connection detecting circuit detects that said load is connected between said external connection terminals;

a switch having an end connected to the output terminal of said overcharge detection comparator, said switch being turned off in response to said load connection detected signal; and means, connected to another end of said switch, for supplying a switch ON control signal to the control terminal of said charge control switch when said switch is turned off.

11. A secondary battery protection circuit as claimed in claim 10, wherein said overcharge reference voltage generating means comprises a Zener diode.

12. A secondary battery protection circuit as claimed in claim 10, wherein said overcharge resistance potential dividing circuit consists of bleeder resistors connected in series with each other between said power source terminal and said ground terminal.

13. A method of protecting a secondary battery by controlling, by turning a discharge control switch on and off, a discharging current flowing from said secondary battery through a load connected between external connection terminals and by controlling, by turning a charge control switch on and off, a charging current flowing through said secondary battery from a charger connected between said external connection terminals, said secondary battery generating a battery voltage, said method comprising the steps of:

on discharging where said load is connected between said external connection terminals or on naturally discharging, turning said discharge control switch off when said battery voltage is lower than a predetermined overdischarge detection threshold voltage;

immediately turning said discharge control switch on when said charger for said load is connected between said external connection terminals;

on charging where said charger is connected between said external connection terminals, turning said charge control switch off when said battery voltage is higher than a predetermined overcharge detection threshold voltage; and immediately turning said charge control switch on when said load for said charger is connected between said external connection terminals.

14. A secondary battery protection circuit for protecting a secondary battery by controlling, by turning a discharge control switch on and off, a discharging current flowing from said secondary battery through a load connected between external connection terminals and by controlling, by turning a charge control switch on and off, a charging current flowing through said secondary battery from a charger connected between said external connection terminals, said secondary battery being connected between a power source terminal and a ground terminal to generate a battery voltage, said secondary battery protection circuit comprising:

discharge switch off means, on discharging where said load is connected between said external connection terminals or on naturally discharging, for turning said discharge control switch off when said battery voltage is lower than a predetermined overdischarge detection threshold voltage;

discharge switch on means for immediately turning said discharge control switch on when said charger for said load is connected between said external connection terminals, charge switch off means, on charging where said charger is connected between said external connection terminals, for turning said charge control switch off when said battery voltage is higher than a predetermined overcharge detection threshold voltage; and charge switch on means for immediately turning said charge control switch on when said load for said charger is connected between said external connection terminals.

15. A secondary battery protection circuit as claimed in claim 14, wherein said discharge control switch consists of a first n-channel field effect transistor having a first source connected to said ground terminal and a first drain, and said charge control switch consisting of a second n-channel field effect transistor having a second drain connected to said second drain of said first n-channel field effect transistor and a second source connected to a negative electrode terminal which is one of said external connection terminals.

16. A secondary battery protection circuit as claimed in claim 14, wherein said discharge switch off means comprises:

overdischarge reference voltage generating means for generating an overdischarge reference voltage corresponding to said overdischarge detection threshold voltage;

an overdischarge resistance potential dividing circuit for dividing said battery voltage to produce an overdischarge potential divided voltage;

an overdischarge detection comparator for comparing said overdischarge potential divided voltage with said overdischarge reference voltage, said overdischarge detection comparator producing an overdischarge detected signal when said overdischarge potential divided voltage is lower said the overdischarge reference voltage; and means, connected to an output terminal of said overdischarge detection comparator, for supplying, in response to said overdischarge detected signal, a discharge switch OFF control signal to a control terminal of said discharge control switch, said discharge switch on means comprising;

a charger connection detecting circuit, connected to a negative electrode terminal which is one of said external connection terminals, for detecting whether of not said charger is connected to said external connection terminals, said charger connection detecting circuit producing a charger connection detected signal when said charger is connected between said external connection terminals;

a first overdischarge control switch having an end connected to the output terminal of said overdischarge detection comparator, said first overdischarge control switch being forcibly put into an OFF state in response to said charger connection detected signal;

a second overdischarge control switch connected between said overdischarge resistor potential dividing circuit and said power source terminal, said second overdischarge control switch being forcibly put into an OFF state in response to said charger connection detected signal; and an overdischarge control output stage, connected to another end of said first overdischarge control switch, for delivering a discharge switch ON control signal to the control switch of said discharge control switch when said first overdischarge control switch is put into the OFF state.

17. A secondary battery protection circuit as claimed in claim 16, wherein said overdischarge reference voltage generating means comprises a Zener diode.

18. A secondary battery protection circuit as claimed in claim 16, wherein said overdischarge resistance potential dividing circuit consists of bleeder resistors connected in series with each other.

19. A secondary battery protection circuit as claimed in claim 14, wherein said charge switch off means comprises:

overcharge reference voltage generating means for generating an overcharge reference voltage corresponding to said overcharge detection threshold voltage;

an overcharge resistance potential dividing circuit for dividing said battery voltage to produce an overcharge potential divided voltage;

an overcharge detection comparator for comparing said overcharge potential divided voltage with said overcharge reference voltage, said overcharge detection comparator producing an overcharge detected signal when said overcharge potential divided voltage is higher said the overcharge reference voltage; and means, connected to an output terminal of said overcharge detection comparator, for supplying, in response to said overcharge detected signal, a charge switch OFF control signal to a control terminal of said charge control switch, said charge switch on means comprising:

a load connection detecting circuit, connected to a negative electrode terminal which is one of said external connection terminals, for detecting whether of not said load is connected to said external connection terminals, said load connection detecting circuit producing a load connection detected signal when said load is connected between said external connection terminals;

a first overcharge control switch having an end connected to the output terminal of said overcharge detection comparator, said first overcharge control switch being forcibly put into an OFF state in response to said load connection detected signal;

a second overcharge control switch connected between said overcharge resistor potential dividing circuit and said ground terminal, said second overcharge control switch being forcibly put into an OFF state in response to said load connection detected signal; and an overcharge control output stage, connected to another end of said first overcharge control switch, for delivering a charge switch ON control signal to the control switch of said charge control switch when said first overcharge control switch is put into the OFF state.

20. A secondary battery protection circuit as claimed in claim 19, wherein said overcharge reference voltage generating means comprises a Zener diode.

21. A secondary battery protection circuit as claimed in claim 19, wherein said overcharge resistance potential dividing circuit consists of bleeder resistors connected in series with each other.

* * * * *